United States Patent [19]

Lamb

[11] 4,072,778

[45] Feb. 7, 1978

[54] SPACING SYSTEM

[76] Inventor: Robert Colin Lamb, 8 Lilac Lane, Maungaraki, Lower Hutt, New Zealand

[21] Appl. No.: 708,006

[22] Filed: July 23, 1976

Related U.S. Application Data

[63] Continuation-in-part of Ser. No. 624,834, Oct. 22, 1975, abandoned.

[51] Int. Cl.² .............................................. B32B 7/08

[52] U.S. Cl. ...................................... 428/52; 428/542

[58] Field of Search .......................... 428/52, 44, 542; 52/481

[56] References Cited

U.S. PATENT DOCUMENTS

| | | | |
|---|---|---|---|
| 3,922,409 | 11/1975 | Stark | 428/44 |
| 3,949,031 | 4/1976 | Fairbanks | 428/304 |

*Primary Examiner*—William J. Van Balen

*Attorney, Agent, or Firm*—Holman & Stern

[57] ABSTRACT

A spacer unit, a discharging gun and a method of retaining a spacing to avoid loss of elastomeric seal between two surfaces are described. The system is particularly useful in the glazing trade for sealing large plate glass panes into aluminum frames. Each unit comprises a plurality of blocks skeletally inter-connected by webs. The cross-sectional area of the blocks and webs presented to a compressive force is still small relative to the cross-sectional area lying within the outer periphery of the unit.

7 Claims, 16 Drawing Figures

SPACING SYSTEM

CROSS-REFERENCE TO RELATED APPLICATION

This is a Continuation-in-Part of my application Ser. No. 624,834 filed Oct. 22, 1975, now abandoned.

BACKGROUND OF THE INVENTION

1. Field of the Invention

This invention relates to a spacer unit, a method of maintaining a panel in a fixed relationship to a frame and a device for dispensing spacer units. The invention is particularly useful in the glazing trade, but should by no means be restricted to such applications.

2. Description of the Prior Art

The traditional method of fitting a pane of glass in a window frame is to pack putty between the glass and the inner part of the frame with which it would otherwise make contact, and on the edge of the outer face of the glass.

This method is not well adapted to fitting glass into metal frames. For these a back tape of butyl rubber or similar elastomer is fitted into the frame and the glass is laid against this. The outer face of the glass is pressed toward the frame by suitable means with which this invention is not concerned and is sealed by putty or a rubber extrusion. In high-rise buildings, especially in places where the wind can be strong, it has been found that a back tape of such material as butyl rubber is extruded or squeezed out so that the glass becomes loose and rain can penetrate round its edge. To prevent this it has become common practice to fit into the back tape at approximately 250 mm centres a series of blocks of a material such a neoprene which will not readily extrude. This is not wholly satisfactory since the neoprene block causes the elastomer in which it is embedded to bulge and to form gaps in such a way that rain can seep around the edge of the glass in the region of the neoprene block.

OBJECTS OF THE INVENTION

It is an object of the present invention to provide a method and apparatus which will avoid the aforementioned difficulties in a simple yet effective manner.

It is a further object of the invention to provide a spacer unit for use in precluding extrusion of sealant in the environment just described, the spacer unit displacing a minimum amount of sealant when installed.

It is a further object to provide a convenient device for installing such a spacer unit in a sealant.

These and other objects and advantages of the invention will be apparent from the following detailed description.

SUMMARY OF THE INVENTION

Accordingly in one aspect the invention may broadly be said to consist in a spacer unit comprising a plurality of blocks skeletally interconnected in spaced relationship by web members, the arrangement being such that in use said blocks are resistant to a compressive force normal to the direction of linkage of said webs and the cross sectional area of said blocks and webs presented to said compressive force is small relative to the cross sectional area lying within the outer periphery of said spacer unit presented to said compressive force.

In another aspect, the invention may be said to broadly consist in a device for discharging spacer units as hereinabove defined which comprises:

a rigid casing, a magazine passing through at least a portion of said casing, said magazine being adapted to receive a plurality of said spacer units, stopping means at the discharge end of said magazine and biasing means adapted to urge said spacer units against the said stopping means, a discharge orifice cooperable with said stopping means whereby the leading said spacer unit held in said magazine against said stopping means is next to and in registry with said discharge orifice, a plunger cooperable with said orifice and movable from a first position next to said leading spacer on the side thereof remote from said orifice to a second position extending through said orifice whereby said leading spacer unit is discharged through said orifice.

In yet a further aspect, the invention may be said to broadly consist in a method of sealing two adjacent surfaces in spaced relationship which comprises applying a strip of elastomeric material of required thickness to said surfaces, inserting a spacer member as hereinabove defined, into said elastomeric material in an orientation to resist compressive forces from said first surface and applying said second surface to said elastomeric material at the side thereof remote from said first surface.

DESCRIPTION OF PREFERRED EMBODIMENTS

Figure 1:
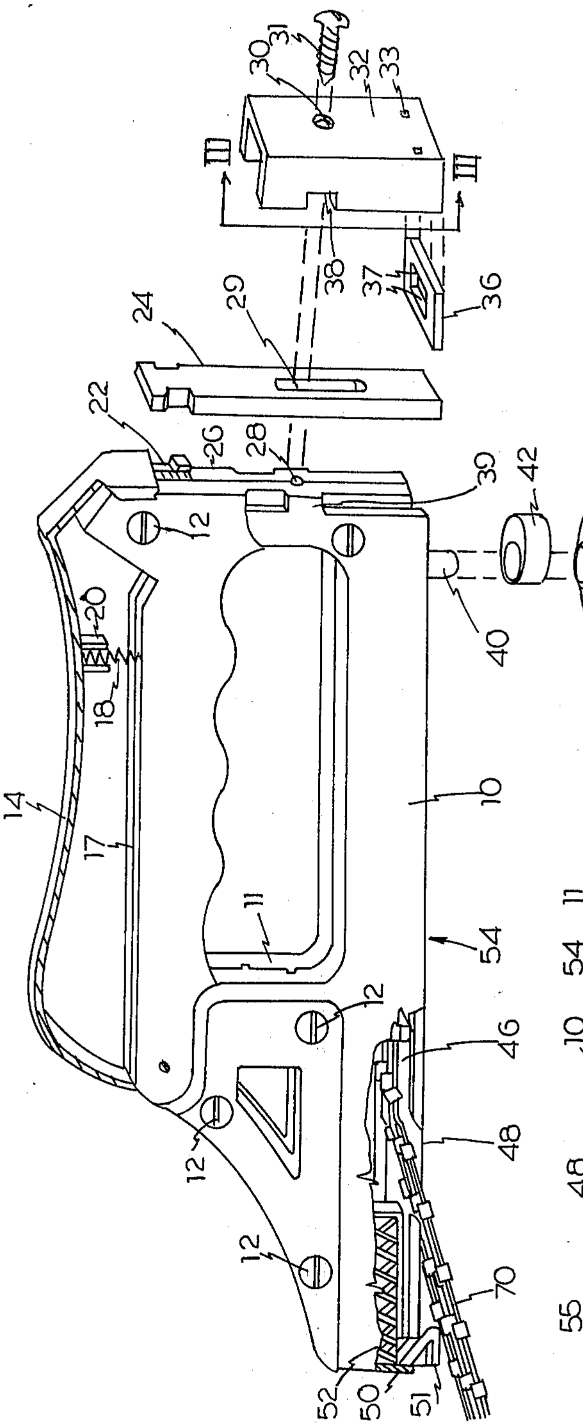
FIG. 1 is an exploded isometric view partly broken away of a device for discharging spacer units according to the invention.

Referring to FIG. 1, the device especially adapted to dispense spacer units according to the invention is illustrated. Basically it comprises a casing consisting of moulded sections 10 and 11 which are the mirror images of one another. The casing includes handle portions 16 and 17. The two halves of the casing are held together by a number of bolts 12.

Figure 2:
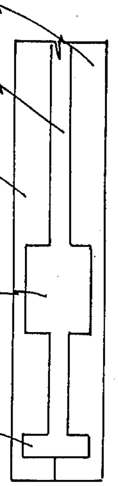
FIG. 2 is a bottom plan view of the rear portion of the casing of the device of FIG. 1.

Within the casing running along the length thereof is a magazine chamber 46. As can be seen from FIG. 2 a slot 54 runs along the length of the magazine out of the bottom of the casing. A follower 50 comprises a cylindrical portion having a handle 51, the shaft of which protrudes through slot 54. A spring 52 is provided within the enclosed cylindrical portion of follower 50. Spring 52 abuts against the casing wall at the end of the magazine chamber 46. Spring 52 has sufficient rating to push the follower to the region of cylindrical boss 40. Chamber 46 has a transverse opening 48 in the bottom thereof intersecting slot 54 through which a strip of spacer units 70 may be inserted. It will be seen that during loading of the magazine, follower handle 51 and follower 50 may be twisted to one side or the other in slot 55 to retain the follower at its stop position. When the magazine has been loaded the follower is rotated so that handle 51 is aligned with slot 54 and the follower can advance along the magazine urging the strip of spacers 70 towards the front or discharge end of the magazine 46.

Figure 3:
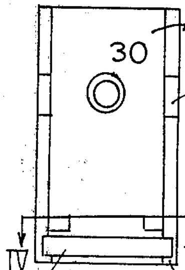
FIG. 3 is the view III—III of FIG. 1.

In the assembled dispensing device there is provided a nose piece 32 having a front face and two side faces. There are two recesses 38 in the side faces which can be inserted over projections 39 on the front face 26 of the casing 10 and 11. Plunger 24 is designed to be enveloped by nose piece 32. It will be seen that plunger 24 interlocks with recess 22 in handle 14 whereby the plunger may be raised or lowered by the handle. There is provided a return spring 18 in socket 20 projecting downwardly from inside handle 14 to raise the handle 14 and hence the plunger 24 to its rest position. As can be seen in FIG. 3 there are a pair of slots 34 in the sides of nose piece 32 into which orifice frame 36 can be slid. When the pieces are assembled and bolt 31 is screwed in through bore 30, slot 29 and bore 28 plunger 24 is in registry with the orifice in orifice frame 36.

Protruding downwardly from the bottom face of casing portions 10 and 11 is boss 40. There is provided an eccentric spacer 42 the central orifice of which fits over member 40. A rest piece 44, the purpose of which will be described below, is provided abutting eccentric 42. Bolt 43 passes through these members into member 40 securing them in position.

It will be appreciated that the dispensing device can be conveniently moulded out of a suitable plastics material, for example, acrylonitrile butadienestyrene (ABS). The two halves of the casing 10 and 11, and the handle 14 being moulded as separate components. Similarly, the exploded components shown in FIG. 1 may be moulded of a hard plastics material. Because of its shearing function orifice frame 36 is preferably constructed of metal.

In the embodiment illustrated, handle 14 is pivoted on a pin in grip portions 16 and 17. In an alternative embodiment, pin 19 can be eliminated and a pair of protruding lugs provided at the heel of handle 14. These lugs would embrace either side of grip portions 16 and 17 and rest within sockets on the outer surfaces of grip portions 16 and 17.

Figure 4:
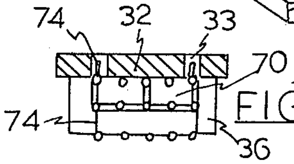
FIG. 4 is the view IV—IV shown in FIG. 3.
Figure 11A:
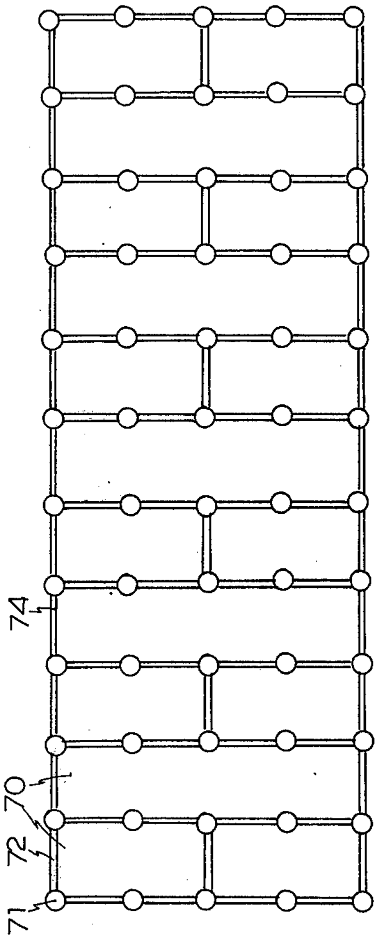
FIGS. 11*a* and 11*b* are respectively a plan view and a side elevation of a strip of spacer units as illustrated in FIG. 7 adapted for use in the discharging device illustrated in FIG. 1.

The principal of operation of the device illustrated in FIG. 1 is virtually identical to that of a staple gun. The compression of handle 14 against grip 16 forces the plunger 24 downwardly, forcing a spacer unit 70 down through orifice frame 36. On closer inspection of the nose piece, in FIG. 1 and in FIG. 4, it will be seen that there are provided square orifices 33. As will be described later in relation to FIGS. 11*a* and *b* a strip of spacer units 70 includes frangible webs 74. Follower 50 urges strips of spacer units 70 along magazine 46 whereby spacer units 70 abut against the inner face of nose piece 32 and the free ends of frangible webs 74 extend into orifices 33. The transverse inner edges 37 of orifice frame 36 are sharpened so that when plunger 24 pushes spacer units 70 down through the orifice, frangible web members 74 are sheared cleanly off.

Figure 5:
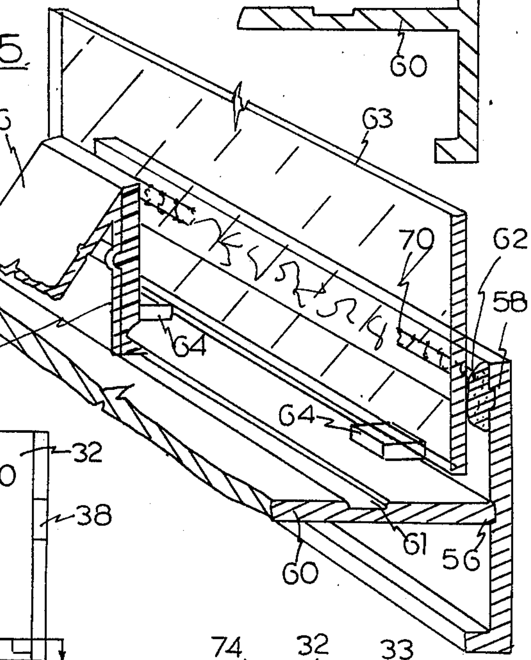
FIG. 5 is a fragmentary isometric view of a window installation incorporating the spacer unit and the method of this invention.

A method of glazing employing the spacer unit is illustrated in FIG. 5. There is provided a typical extruded window frame 56 for use in glazing a high rise building. The frame 56 comprises a vertical member 58 and a horizontal member 60, there being provided a rail receiving recess 61 in horizontal portion 60. One starts with a completely bare frame 56 and provides a strip of elastomeric material, for example, a butyl putty, along vertical member 58 near the upper edge thereof.

Figure 6:
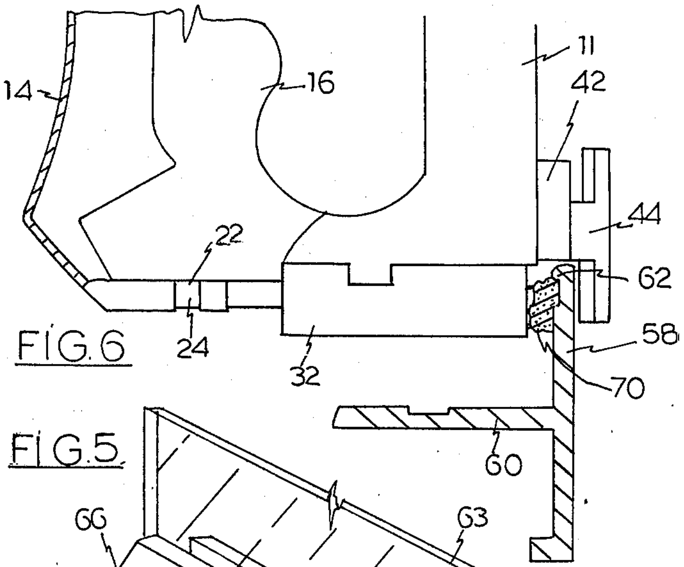
FIG. 6 is an elevation, partly in section, showing a fragmentary view of the device shown in FIG. 1 discharging a spacer unit into elastomeric material in position on a window frame.

Referring now to FIG. 6, eccentric 42 is adjusted so that the vertical position of the gun is at the correct height to discharge a spacer 70 into elastomeric material 62. The horizontal distance of the discharge point to the elastomer is adjusted by varying the position of rest piece 44 so that the spacing between the rest piece and the discharge orifice is slightly greater than the thickness of the vertical member 58 and the elastomeric material 62.

The spacers 70 are conveniently discharged at 250 mm centres along the length of frame portion 58. Next there are positioned blocks 64, conveniently of neoprene rubber resting at the apex of vertical portion 58 and horizontal portions 60. A pane of glass 63 is rested on blocks 64 and pressed against the elastomer 62 into which spacer units 70 have been injected. The elastomeric material 62 is flattened against the pane of glass to effect a complete seal therealong. Spacer units 70 are chosen so as to be slightly less in thickness than the thickness of the elastomeric seal. Thus the pane of glass 63 will extrude sufficient elastomeric material 62 to provide a complete seal but the spacers 70 will provide an effective stop to prevent elastomeric material being extruded completely out of the seal when the pane of glass is subjected to compressive forces in the direction of the frame, for example by wind loading.

The final step in the glazing operation comprises inserting a further elastomeric sealant material 68 on the opposite side of the glass, inserting suitable spacers into the sealant material and sliding a suitable retaining member 66 into recess 61 to hold the glass in a firm seal.

Spacer units according to the present invention are illustrated in enlarged views in FIGS. 7 to 11. The most preferred embodiment is that shown in FIGS. 7 and 11. This embodiment is preferred because the cylindrical shape of the blocks is the most readily moulded. The units comprise two parallel rows each consisting of five cylindrical blocks 71. Each block in a row is connected to its neighbour by a web 72. There are provided three cross webs on the first third and fifth blocks in a row. Exemplary dimensions are illustrated in FIGS. 7*a* and 7*b*. The spacing to be achieved by the unit 70 shown therein is the dimension 2, the length of the longitudinal axis of each of the cylindrical blocks, which is 4 mm. The diameter of each cylinder as illustrated is the dimension 3 which is 1.5 mm. The dimension 8 which is the spacing between centres of adjacent blocks is 4 mm. A thickness of each web 72 is a dimension 5, thereupon 0.5 mm while the width of each web 72 is the dimension 7, 1.5 mm. It will be appreciated that the side elevation view in 7*b* is on a different scale from that shown in FIG. 7*a*.

Figures 7A, 7B, 8A, 8B, 9A, 9B, 10A, 10B:
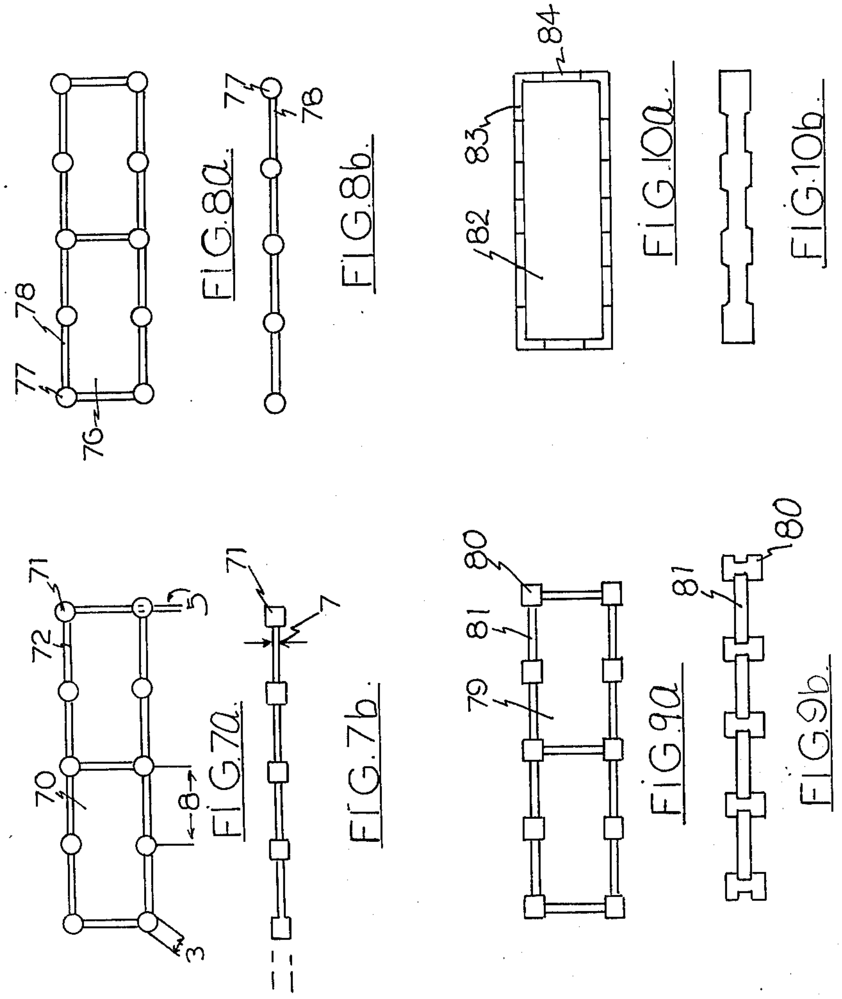
FIGS. 7*a*, 8*a*, 9*a* and 10*a* are plan views
FIGS. 7*b*, 8*b*, 9*b*, and 10*b* are side elevation of various embodiments of spacer units according to the invention.

In FIGS. 8*a* and 8*b* there is illustrated a spacer unit 76 comprising spherical blocks 77 interconnected by webs 78 which are the same as webs 72 in FIG. 7. In FIG. 9 there are illustrated spool shaped blocks 80 interconnected by web units 81 to form a spacer unit 79. Blocks 83 in FIG. 10 comprise substantially rectangular walls which have been cut away to include web portions 84 making up a spacer unit 82.

Figure 11B:
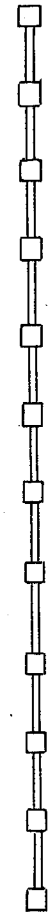

In FIG. 11 there is illustrated a strip comprising 6 spacer units 70. Each of these spacer units is interlinked by a pair of frangible webs 74 joining outer blocks 71. As was described hereinabove, these frangible webs 74 are preferably sheared off in a discharge gun.

Although spacer units 70 are preferably applied through use of the device illustrated in FIGS. 1 to 4 and 6, individual spacer units 70 could be applied by hand in more modest applications of the invention. The width of the various web members (dimension 7 in FIG. 7*b*) is less than the longitudinal length of the blocks (dimension 2 FIG. 7*b*). This design is preferred as the entire spacer unit 70 will be embedded in elastomer except for the end faces of blocks 71. If the dimensions 2 and 7 were identical the whole of the frame periphery of the spacer unit 70 at either end thereof would be in contact with the glass of the frame. Elastomer would be within the enclosed empty space. Any minor void or wrinkle in the elastomer or any scratch in the frame would allow the water to reach the peripheral face. Since the face would be continuous the water would track around the spacer and would increase the probability of leakage to the inside surface of the glass. When the continuity of the peripheral edge is broken as illustrated the spacing between the faces 71 are filled with putty thus reducing the chances of occurrence of leakage of this type.

One advantage of the preferred embodiment of the frame is that under loading it is possible to have some distortion of the geometry of the unit as a whole without loss of its spacing function. The smaller dimensions of the webs allow a certain amount of flexibility so that the distortion occurs in the webs.

Spacer units are cheapest if they can be moulded, pressed or cast. The material should be non-extrudable under design (e.g. wind) loads. It should not damage glass. It should be inert to glazing compounds and to weather. It should have a life compatible with that of the glazing system.

It has been found that an acetal resin, for example, that sold under the trade mark "Delrin", satisfies these requirements. In the form described in relation to FIGS. 1 and 2 the variation of its length dimension under a wind gust imposing a load of 50 kg on one spacer is 0.5% to 1% and it recovers from creep after this load has been applied and removed. Such a spacer unit is intended for continuous loads of 10 – 15 kg.

It may be noted that a 2 meter square of glass subjected to a 150 kph. gust of wind imposes a short term load of 5 kg on each spacer, if the centre to centre distance of the spacers is 250 mm approximately.

It has also been found that a glass or mineral filled thermoplastics material or else acrylonitrile butadiene styrene (ABS) is suitable. The invention does not lie in the selection of any particular plastic, however.

When spacers of the type here described and inserted with a spacing as here suggested are used in conjunction with a butyl rubber back tape, it is found that the whole spacer is embedded in butyl rubber, except for the end faces of blocks 1, and that there is no significant bulge in the butyl rubber over the site of the spacer.

The spacers of the present invention can be used with putty as readily as with butyl back tape.

Such spacers can be used for a wide variety of purposes, for some of which the size would best be markedly different from the size here suggested. When such spacers are to be used in such circumstances that they are to be buried in an elastomer the relation between total area of plastic in the plane shown in FIG. 1 with the total area of the array shown in FIG. 1 must be considered. The relation here described is suitable for a spacer of the size described, when used with butyl rubber. In particular when the size of the spacer is much greater than here described, it may be possible to increase the relative amount of resin.

What I claim is:

1. A spacer unit for preventing extrusion of sealants comprising a plurality of incompressible blocks skeletally interconnected in spaced relationship by incompressible web members, said blocks and webs comprising an arrangement and material resistant to a compressive force normal to the direction of interconnection of said webs and blocks, the cross-sectional area of said blocks and webs being relatively small with respect to the entire cross-sectional area lying within the outer periphery of said spacer unit, said webs and blocks defining openings therebetween for receiving a sealant for preventing extrusion thereof when the spacer unit is subjected to a compressive force normal to the direction of interconnection of said webs and blocks.

2. The spacer unit as claimed in claim 1 wherein each said block is cylindrical, right prismatic or spool shaped.

3. The spacer unit as claimed in claim 2 wherein said blocks have parallel longitudinal axes perpendicular to the direction of linkage of each of said webs, one set of end faces lying in a first plane and a second set of end faces lying in a second plane, said first and second planes being parallel.

4. The spacer unit as claimed in claim 1 wherein the cross sectional area within the periphery of said spacer unit is rectangular.

5. The spacer unit as claimed in claim 1 wherein said webs are elongate, the longitudinal axes of said elongate webs are normal to the longitudinal axes of each of said blocks and the width of each said elongate web is less than the longitudinal length of said blocks.

6. The spacer unit as claimed in claim 1 wherein each said spacer unit comprises two parallel rows of five blocks each, there being provided webs interconnecting the first third and fifth blocks of the successive rows.

7. The spacer units according to claim 6 interconnected by pairs of frangible interconnecting webs.

* * * * *

UNITED STATES PATENT AND TRADEMARK OFFICE
CERTIFICATE OF CORRECTION

PATENT NO. : 4,072,778

DATED : February 7, 1978

INVENTOR(S) : ROBERT COLLIN LAMB

It is certified that error appears in the above-identified patent and that said Letters Patent are hereby corrected as shown below:

The following priorities should be listed:

New Zealand Provisional Application No. 177,365, filed April 29, 1975;

New Zealand Complete Application No. 177,365, filed April 22, 1976.

The following references should be listed:

U.S. Patent No. 3,546,055 12/1970 Spertus 428/52

Dutch Patent No. 6,509,807 1/1967 Holland 428/52

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*